United States Patent
Nam et al.

(10) Patent No.: US 12,222,362 B2
(45) Date of Patent: Feb. 11, 2025

(54) METHOD OF MEASURING PARAMETERS OF PLASMA, APPARATUS FOR MEASURING PARAMETERS OF PLASMA, PLASMA PROCESSING SYSTEM, AND METHOD OF PROCESSING WAFER

(71) Applicant: SAMSUNG ELECTRONICS CO., LTD., Suwon-si (KR)

(72) Inventors: Yoonbum Nam, Seoul (KR); Namkyun Kim, Pyeongtaek-si (KR); Seungbo Shim, Seoul (KR); Donghyeon Na, Hwaseong-si (KR); Naohiko Okunishi, Hwaseong-si (KR); Dongseok Han, Daegu (KR); Minyoung Hur, Hwaseong-si (KR); Byeongsang Kim, Hwaseong-si (KR); Kuihyun Yoon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 17/747,303

(22) Filed: May 18, 2022

(65) Prior Publication Data

US 2023/0060400 A1  Mar. 2, 2023

(30) Foreign Application Priority Data

Aug. 27, 2021  (KR) .......... 10-2021-0114244

(51) Int. Cl.
*G01N 9/24* (2006.01)
*H01Q 1/40* (2006.01)
*H01Q 9/30* (2006.01)

(52) U.S. Cl.
CPC .......... *G01N 9/24* (2013.01); *H01Q 1/40* (2013.01); *H01Q 9/30* (2013.01)

(58) Field of Classification Search
None
See application file for complete search history.

(56) References Cited

U.S. PATENT DOCUMENTS 4,623,508 A * 11/1986 Glesius .............. G21C 17/108
250/390.1
5,471,115 A * 11/1995 Hikosaka .......... H01J 37/3299
315/111.41

(Continued)

FOREIGN PATENT DOCUMENTS

DE   102020208535 A1 * 1/2022 .......... H05B 6/6432
JP        4418661 A       2/2010

(Continued)

OTHER PUBLICATIONS

Times Microwave Systems. Silicon Dioxide Cable Assemblies. Dec. 2019 (Year: 2019).*

(Continued)

*Primary Examiner* — Patrick Assouad
*Assistant Examiner* — Mark A Shabman
(74) *Attorney, Agent, or Firm* — Sughrue Mion, PLLC

(57) ABSTRACT

An apparatus for measuring parameters of plasma includes a cutoff probe. The cutoff probe includes: a first antenna having a line shape and configured to emit a microwave to the plasma in response to the signal provided by at least one processor; a second antenna having a line shape and configured to generate an electrical signal in response to receiving the microwave emitted by the first antenna and transferred through the plasma; a first insulating layer; a second insulating layer; a first shield; a second shield; an end protection layer covering an end of each of the first insulating layer, the second insulating layer, the first shield, and the second shield; a first antenna protection layer, of insulating nature, covering the first antenna; and a second (Continued)

antenna protection layer, of insulating nature, covering the second antenna.

17 Claims, 7 Drawing Sheets

(56) References Cited

U.S. PATENT DOCUMENTS

| | | |
|---|---|---|
| 10,229,819 B2 | 3/2019 | Hirano et al. |
| 10,309,839 B2 | 6/2019 | Yoshida et al. |
| 2002/0047543 A1* | 4/2002 | Sugai .................. H05H 1/0062 315/111.21 |
| 2005/0016683 A1* | 1/2005 | Kim .................... H05H 1/0062 156/345.43 |
| 2017/0014184 A1* | 1/2017 | Hancock ............ A61B 18/1492 |
| 2019/0355558 A1* | 11/2019 | Lee ................... H01J 37/32458 |
| 2021/0251067 A1* | 8/2021 | Pohle .................. H05H 1/0062 |

FOREIGN PATENT DOCUMENTS

| | | |
|---|---|---|
| KR | 10-1324990 B1 | 11/2013 |
| KR | 10-1916702 B1 | 11/2018 |
| KR | 10-2136660 B1 | 7/2020 |

OTHER PUBLICATIONS

You et al., "A cutoff probe for the measurement of high density plasma," ELSEVIER, Thin Solid Films, vol. 547, pp. 250-255, 2013.

You, "Introduction to cutoff probe," Vacuum Magazine, Jun. 2017, https://doi.org/10.5757/vacmac.4.2.10, total 5 pages.

* cited by examiner

METHOD OF MEASURING PARAMETERS OF PLASMA, APPARATUS FOR MEASURING PARAMETERS OF PLASMA, PLASMA PROCESSING SYSTEM, AND METHOD OF PROCESSING WAFER

CROSS-REFERENCE TO RELATED APPLICATION

This application is based on and claims priority under 35 U.S.C. § 119 to Korean Patent Application No. 10-2021-0114244, filed on Aug. 27, 2021 in the Korean Intellectual Property Office, the disclosure of which is incorporated by reference herein in its entirety.

BACKGROUND

The disclosure relates to a method of measuring parameters of plasma, an apparatus for measuring parameters of plasma, and a plasma processing system. More particularly, the disclosure relates to a method of measuring parameters of plasma, an apparatus for measuring parameters of plasma, and a wafer processing system using the plasma, which are used in a semiconductor element manufacturing process.

One example of a process for manufacturing a semiconductor element is a plasma process including plasma-induced deposition, plasma etching, and plasma cleaning. Recently, due to miniaturization and high integration of a semiconductor element, an effect of a fine error in a plasma process on the semiconductor product quality has increased. Accordingly, various methods of precisely measuring parameters for indicating a state of plasma in a plasma facility are underway.

SUMMARY

The disclosure relates to a method of measuring parameters of plasma, an apparatus for measuring parameters of plasma, and a plasma processing system.

In accordance with an aspect of the disclosure, an apparatus for measuring parameters of plasma includes a cutoff probe; and at least one processor configured to provide, to the cutoff probe, a signal for measuring the parameters of the plasma in a plasma processing apparatus, wherein the cutoff probe includes a first antenna having a line shape and configured to emit a microwave to the plasma in response to the signal provided by the at least one processor; a second antenna having a line shape and configured to generate an electrical signal in response to receiving the microwave that has been emitted by the first antenna and transferred through the plasma; a first signal line connecting the first antenna to the at least one processor; a second signal line connecting the second antenna to the at least one processor; a first insulating layer covering the first signal line; a second insulating layer covering the second signal line; a first shield covering the first insulating layer; a second shield covering the second insulating layer; an end protection layer covering an end of each of the first insulating layer, the second insulating layer, the first shield, and the second shield; a first antenna protection layer including a first insulating material and covering the first antenna; and a second antenna protection layer including a second insulating material and covering the second antenna.

In accordance with an aspect of the disclosure, a method of measuring parameters of plasma includes calculating a microwave band spectrum of a forward transmission gain of the plasma, the plasma having a changing density over time, by applying a microwave to the plasma and sensing an intensity of the microwave that has been transferred through the plasma; and calculating a moving minimum of the microwave band spectrum of the forward transmission gain of the plasma.

In accordance with an aspect of the disclosure, a method of processing a wafer includes processing the wafer by using a plasma generated by using source power having a changing magnitude over time; and measuring parameters of the plasma, wherein the measuring of the parameters of the plasma includes calculating a microwave band spectrum of a forward transmission gain of the plasma by applying a microwave to the plasma and sensing an intensity of the microwave that has been transferred through the plasma; and calculating a moving minimum of the microwave band spectrum of the forward transmission gain of the plasma.

In accordance with an aspect of the disclosure, a plasma processing system includes a plasma processing apparatus configured to process a wafer by using plasma; and an apparatus for measuring parameters of plasma, wherein the apparatus for measuring the parameters of the plasma includes a cutoff probe; and at least one processor configured to provide, to the cutoff probe, a signal for measuring the parameters of the plasma in the plasma processing apparatus, wherein the cutoff probe includes a first antenna having a line shape and configured to emit a microwave to the plasma in response to the signal provided by the at least one processor; a second antenna having a line shape and configured to generate an electrical signal in response to receiving the microwave that has been emitted by the first antenna and transferred through the plasma; a first coaxial cable connecting the first antenna to the at least one processor; a second coaxial cable connecting the second antenna to the at least one processor; an end protection layer covering an end of each of the first coaxial cable and the second coaxial cable; a first antenna protection layer including a first insulating material and covering the first antenna; and a second antenna protection layer including a second insulating material and covering the second antenna.

In accordance with an aspect of the disclosure, a plasma density measuring apparatus includes a cutoff probe including a first antenna and a second antenna; and at least one processor configured to apply a plurality of signals to the cutoff probe to cause the first antenna to emit a plurality of microwaves, wherein each microwave of the plurality of microwaves has a different frequency from each other microwave of the plurality of microwaves, and wherein the at least one processor is configured to receive a plurality of measurement signals from the second antenna, each measurement signal of the plurality of measurement signals corresponding to a respective microwave of the plurality of microwaves.

BRIEF DESCRIPTION OF THE DRAWINGS

The above and other aspects, features, and advantages of certain embodiments of the disclosure will be more apparent from the following description taken in conjunction with the accompanying drawings in which.

DETAILED DESCRIPTION OF EMBODIMENTS

Figure 1:
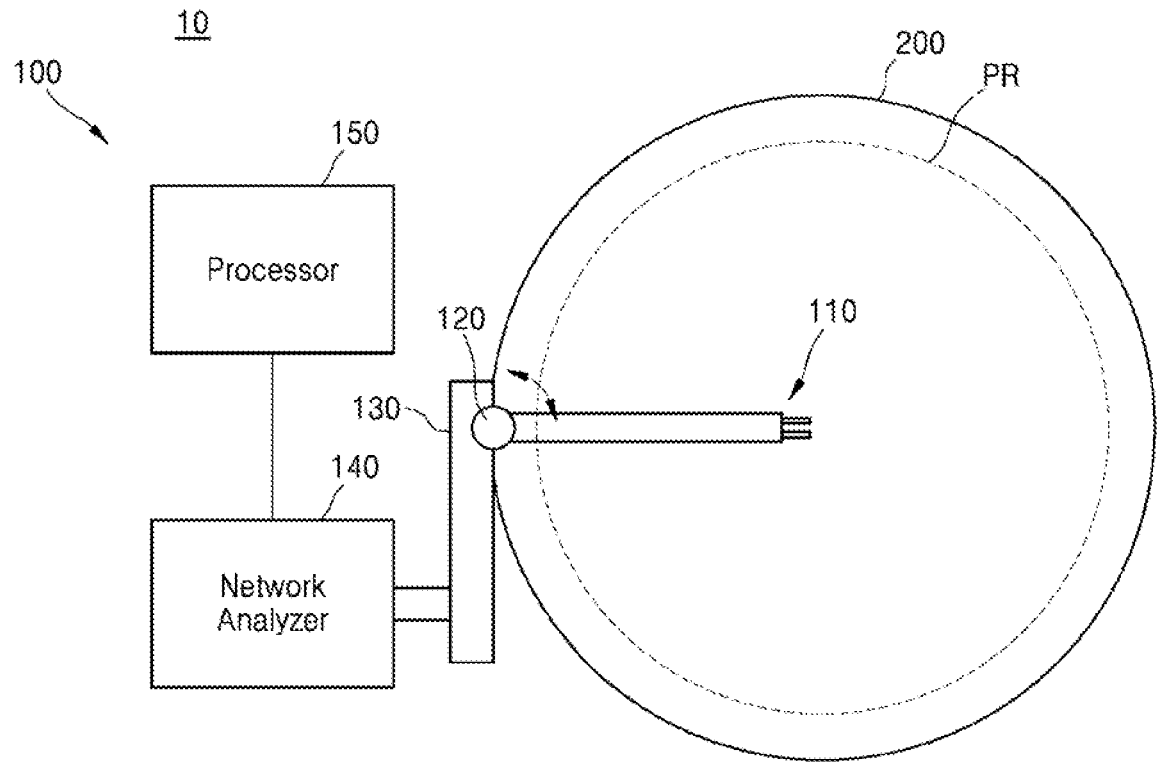
FIG. 1 is a diagram of a plasma processing system according to an embodiment.

Hereinafter, embodiments of the disclosure are described in detail with reference to the accompanying drawings. Identical reference numerals are used for the same components in the drawings, and a duplicate description thereof will be omitted.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

FIG. 1 is a diagram of a plasma processing system 10 according to an example embodiment.

Figure 2:
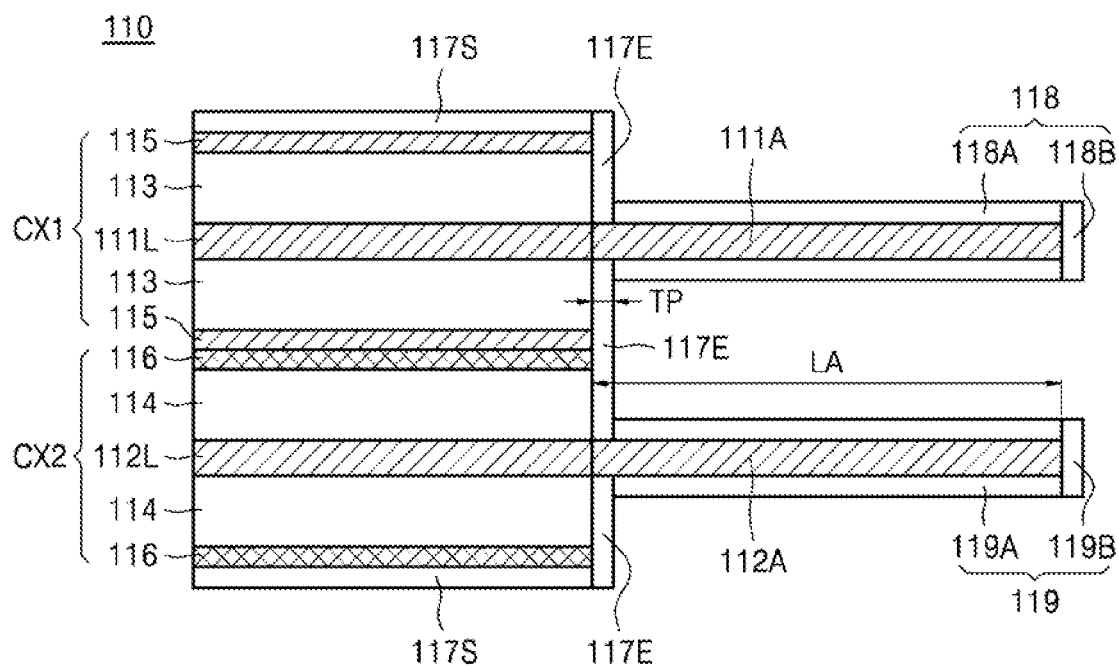
FIG. 2 is a cross-sectional view of a cutoff probe included in an apparatus for measuring parameters of plasma in FIG. 1.

FIG. 2 is a cross-sectional view of a cutoff probe 110 included in an apparatus for measuring parameters of plasma 100 in FIG. 1.

Referring to FIGS. 1 and 2, the plasma processing system 10 may include the apparatus for measuring parameters of plasma (e.g., a plasma density measuring apparatus) 100 and a plasma processing apparatus 200.

The plasma processing apparatus 200 may be configured to generate plasma. The plasma processing apparatus 200 may include any one or more of a capacitively coupled plasma source, an inductively coupled plasma source, a microwave plasma source, a remote plasma source, etc.

The plasma processing apparatus 200 may include an apparatus for processing a wafer by using generated plasma. The plasma processing apparatus 200 may perform, on a wafer, any one or more of plasma annealing, plasma etching, plasma enhanced chemical vapor deposition, plasma sputtering, and plasma cleaning.

In an example, the plasma processing apparatus 200 may perform, for example, a reactive ion etching process. The reactive ion etching process may be a dry etching process in which a species excited by a high frequency radio frequency (RF) power source (that is, a radical or an ion) etches a substrate or a thin layer in a lower pressure chamber. The reactive ion etching process may be performed by a physical/chemical complex operation of bombardment of energetic ions and chemically active species. Reactive ion etching may include etching of an insulating layer such as silicon oxide, etching of a metal material, and etching of a semiconductor material doped or undoped.

In an example, the plasma processing apparatus 200 may perform, for example, an isotropic etching process, on a wafer. The plasma processing apparatus 200 may substitute silicon oxide formed on a wafer with hexafluoric acid ammonium ($(NH_4)_2SiF_6$), and may perform a process of removing the hexafluoric acid ammonium by using an annealing process.

In an example, the plasma processing apparatus 200 may perform a process of isotropically removing any one of crystalline and/or amorphous silicon, silicon nitride, and a metal, by alternatively and repeatedly performing a plasma process and an annealing process to any one of crystalline and/or amorphous silicon, silicon nitride, and a metal on a wafer.

A wafer may include, for example, silicon (Si). A wafer may include a semiconductor element such as germanium (Ge), or a compound semiconductor such as silicon carbide (SiC), gallium arsenide (GaAs), and indium arsenide (InAs). According to some embodiments, a wafer may have a silicon on insulator (SOI) structure. A wafer may include a buried oxide layer. According to some embodiments, a wafer may include a conductive region, for example, a well doped with impurities. In some embodiments, a wafer may have various element isolation structures such as a shallow trench isolation (STI) that separates the doped wells from each other.

The apparatus for measuring parameters of plasma 100 may be configured to measure the parameters of the plasma in the plasma processing apparatus 200. The apparatus for measuring parameters of plasma 100 may include the cutoff probe 110, a rotation driving apparatus 120, a controller 130, a network analyzer 140, and a processor 150.

According to example embodiments and with reference to FIG. 2, the cutoff probe 110 may include a first antenna 111A, a second antenna 112A, a first signal line 111L, a second signal line 112L, a first insulating layer 113, a second insulating layer 114, a first shield 115, a second shield 116, a side surface protection layer 117S, an end protection layer 117E, a first antenna protection layer 118, and a second antenna protection layer 119.

The cutoff probe 110 may have durability against plasma of a higher density, and have a higher measurement speed, compared to a conventional probe for measuring the parameters of plasma, such as a Langmuir probe.

The first insulating layer 113 may cover the first signal line 111L, and the first shield 115 may cover the first insulating layer 113. The first signal line 111L may be apart from the first shield 115 with the first insulating layer 113 therebetween. The second insulating layer 114 may cover the second signal line 112L, and the second shield 116 may cover the second insulating layer 114. The second signal line 112L may be apart from the second shield 116 with the second insulating layer 114 therebetween. The first and second insulating layers 113 and 114 may insulate the first and second signal lines 111L and 112L from the first and second shields 115 and 116, respectively.

The first signal line 111L, the first insulating layer 113, and the first shield 115 may constitute a first coaxial cable CX1 connected to the first antenna 111A, and the second signal line 112L, the second insulating layer 114, and the second shield 116 may constitute a second coaxial cable CX2 connected to the second antenna 112A.

The first and second signal lines 111L and 112L may include a conductive material, for example, copper, etc. The first and second shields 115 and 116 may include a mesh structure including a conductive material, for example, copper. The first and second shields 115 and 116 may be grounded. Accordingly, an effect of external noise on a measurement signal may be reduced, and cross-talk between the first and second signal lines 111L and 112L may be prevented.

The first antenna 111A may be connected to the first signal line 111L, and the second antenna 112A may be connected to the second signal line 112L. The first antenna 111A may protrude from the first coaxial cable CX1, and the second antenna 112A may protrude from the second coaxial cable CX2.

According to some embodiments, the first antenna 111A may include an emitter configured to generate and emit a microwave. According to some embodiments, the second antenna 112A may include a receiver configured to receive the microwave that is emitted by the first antenna 111A after it proceeds through plasma.

The first and second antennas 111A and 112A may measure a spectrum in a microwave band (e.g., a microwave band spectrum) of the parameters of the plasma. The first and second antennas 111A and 112A may be configured to measure a forward transmission gain parameter S21 (refer to FIG. 3) of plasma, which is defined as a ratio of a magnitude of a signal received by the second antenna 112A to a magnitude of a signal emitted by the first antenna 111A. The microwave band spectrum of the forward transmission gain parameter S21 may be measured, by scanning a frequency of the signal generated by the first antenna 111A in the microwave band.

When turbulence, for example, a microwave generated by the first antenna 111A, occurs in plasma, proceeding of the turbulence in the plasma may be determined according to a Maxwell equation. In this case, according to a dispersion relation equation of plasma, when a frequency of a microwave, or turbulence, is less than a frequency determined by characteristics of plasma (for example, an electron density), a wave number of the microwave may be an imaginary number, and accordingly, the microwave emitted by the first antenna 111A may become a diminishing wave, may not be transferred to the second antenna 112A, the receiver, and may perish while proceeding through plasma. On the other hand, when the frequency of a microwave, or turbulence, is greater than a characteristic frequency of plasma, the wave number of the microwave may be a real number, and accordingly, the microwave may be transferred to the second antenna 112A through plasma.

Accordingly, when a spectrum of the forward transmission gain parameter S21 of plasma is measured, the electron density of plasma may be calculated based on a local minimum frequency of the spectrum of the forward transmission gain parameter S21. A relation between a local minimum frequency $f_c$ of a spectrum and the electron density no of plasma may be expressed as Formula 1 below.

$$n_0 = \frac{\epsilon_0 m}{e^2}\omega_c^2 = 1.24*(fc)^2*10^{10} \text{cm}^{-3} \qquad \text{[Formula 1]}$$

In this case, m may be a mass of an electron, $\epsilon_0$ may be the permittivity of a vacuum, e may be a fundamental charge, and $\omega_c$ may be a cutoff frequency (or $2\pi*f_c$).

Each of the first and second insulating layers 113 and 114 may include an insulating material (e.g., a first insulating material and a second insulating material, respectively). According to example embodiments, the first and second insulating layers 113 and 114 may include an insulating material having high heat resistance. The first and second insulating layers 113 and 114 may include, for example, $SiO_2$. According to example embodiments, because the first and second insulating layers 113 and 114 include an insulating material having high heat resistance, a damage of the cutoff probe 110 may be prevented in a situation of measuring high density plasma.

The side surface protection layer 117S may cover side surfaces of the first and second coaxial cables CX1 and CX2. The side surface protection layer 117S may include a tube including an insulating material. The end protection layer 117E may cover ends of the first and second coaxial cables CX1 and CX2. The end protection layer 117E may include an insulating material, may be provided in a paste type, and may have a thickness TP.

According to example embodiments, the side surface protection layer 117S and the end protection layer 117E may include a ceramic material or a stainless material. Unlike as illustrated in FIG. 2, the side surface protection layer 117S and the end protection layer 117E may be portions of a single tube, or each may also be provided in a paste type. In this case, the side surface protection layer 117S and the end protection layer 117E may be integrated and constitute a single continuous insulating protection layer.

According to example embodiments, the first antenna 111A may be covered by the first antenna protection layer 118, and the second antenna 112A may be covered by the second antenna protection layer 119. According to example embodiments, the first antenna protection layer 118 may contact the first antenna 111A, and the second antenna protection layer 119 may contact the second antenna 112A.

The first antenna protection layer 118 may include a first portion 118A covering side surfaces of the first antenna 111A and a second portion 118B covering an end of the first antenna 111A. The second antenna protection layer 119 may cover a first portion 119A covering side surfaces of the second antenna 112A and a second portion 119B covering an end of the second antenna 112A.

According to example embodiments, the first and second antenna protection layers 118 and 119 may include an insulating material. According to example embodiments, the first and second antenna protection layers 118 and 119 may include any one of a ceramic material and a stainless material.

The first portion 118A of the first antenna protection layer 118 may be provided in a tube type, and the second portion 118B may be provided in a paste type. The first portion 119A of the second antenna protection layer 119 may be provided in a tube type, and the second portion 119B may be provided in a paste type.

Unlike as illustrated in FIG. 2, the first and second portions 118A and 118B may be portions of a single tube, or each may be provided in a paste type. In this case, the first and second portions 118A and 118B may constitute a single continuous layer.

Similarly, the first and second portions 119A and 119B of the second antenna protection layer 119 may be portions of a single tube, or each may be provided in a paste type. In this case, the first and second portions 119A and 119B of the second antenna protection layer 119 may constitute a single continuous layer.

According to example embodiments, because the first and second antennas 111A and 112B are protected by the first and second antenna protection layers 118 and 119, respectively, even in the case of measuring the parameters of the plasma having a high density, a damage of each of the first and second antennas 111A and 112A may be prevented. Accordingly, the cutoff probe 110 capable of measuring plasma having a high density may be provided.

Figure 3A:
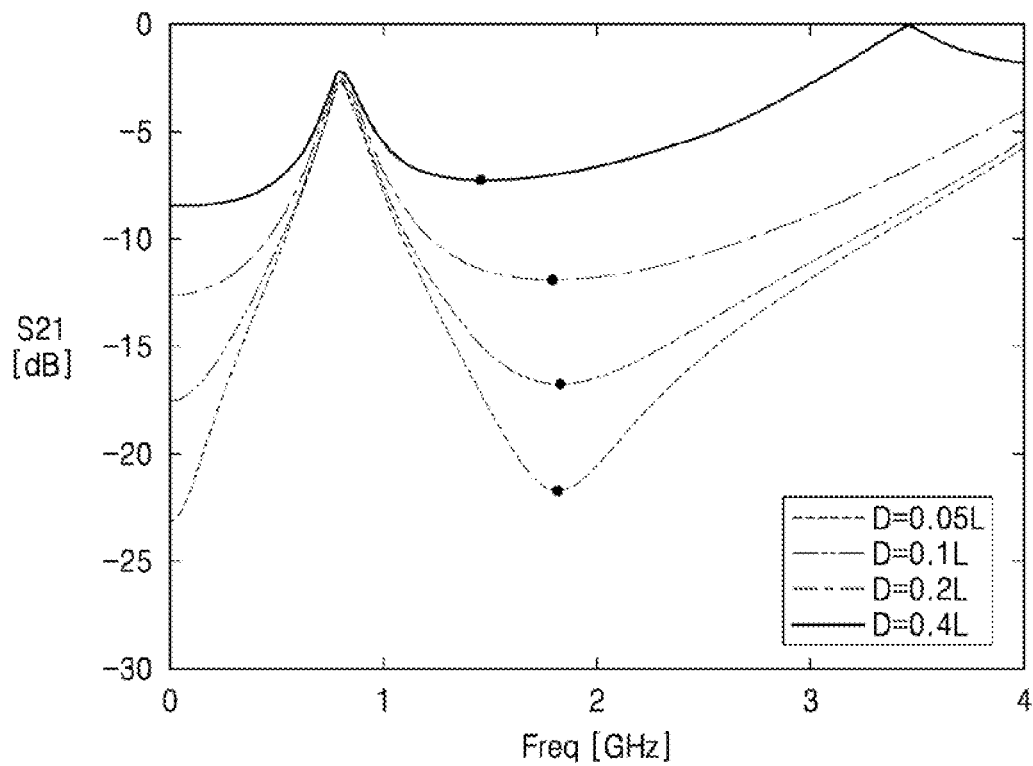
FIG. 3A is a graph illustrating an effect of a thickness of an end protection layer, according to an embodiment.

FIG. 3A is a graph illustrating an effect of a thickness TP of the end protection layer 117E, according to an example embodiment.

In FIG. 3A, the horizontal axis may represent a frequency in GHz units, and the vertical axis may represent a magnitude of the forward transmission gain parameter S21 of plasma in dB units. In experimental examples in FIG. 3A, plasma may be generated by substantially constant source power. In FIG. 3A, a local minimum corresponding to the cutoff frequency of plasma may be represented as a black point.

Referring to FIGS. 2 and 3A, when the thickness TP of the end protection layer 117E is about 0.1 or about 0.05 times a length LA of each of the first and second antennas 111A and 112A, it is identified that a well-marked local minimum is formed on the spectrum of the forward transmission gain parameter S21. On the other hand, when the thickness TP of the end protection layer 117E is about 0.2 or about 0.4 times the length LA of each of the first and second antennas 111A and 112A, it is identified that a local minimum on the spectrum of the forward transmission gain parameter S21 is not well-marked.

According to an experiment example, when the thickness TP of the end protection layer 117E is less than about 0.01 times the length LA of each of the first and second antennas 111A and 112A, it is identified that protection of the first and second antennas 111A and 112A is insufficient.

According to example embodiments, by maintaining the thickness TP of the end protection layer 117E in a range of about 0.01 to about 0.1 times the length LA of each of the first and second antennas 111A and 112A, the first and second coaxial cables CX1 and CX2 and the first and second antennas 111A and 112A may be protected under a condition of high density plasma, and at the same time, the reliability of measurement of the parameters of the plasma by using the cutoff probe 110 may be maintained.

Figure 3B:
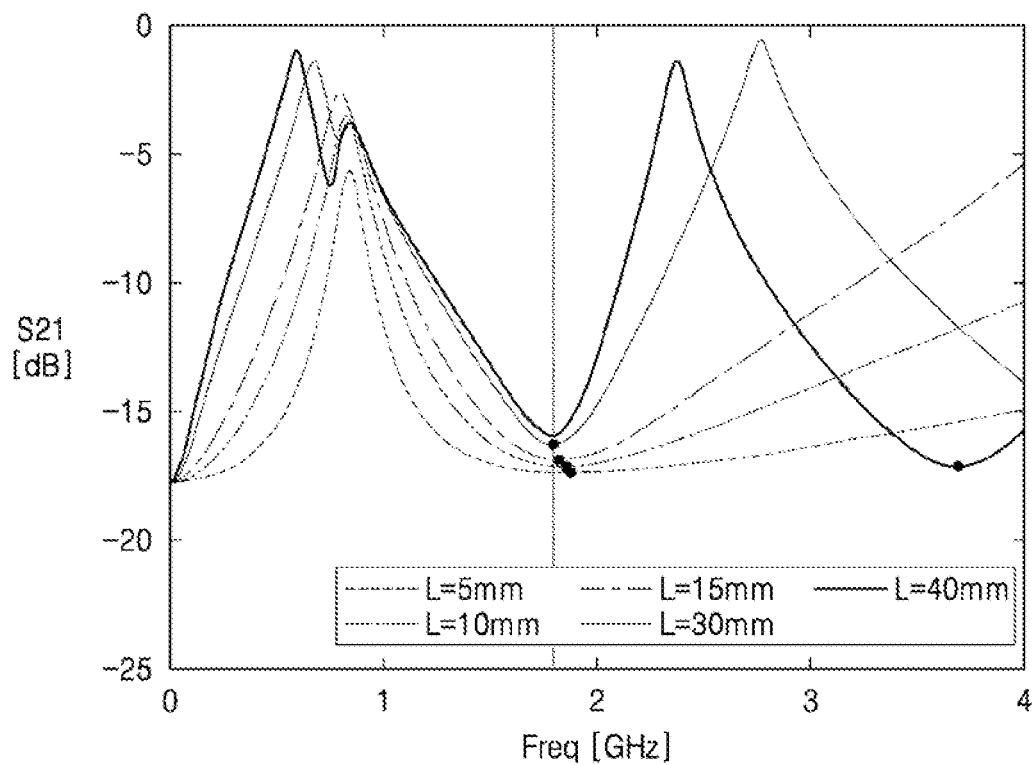
FIG. 3B is a graph illustrating an effect of lengths of first and second antennas, according to an embodiment.

FIG. 3B is a graph illustrating an effect of the length LA of the first and second antennas 111A and 112A, according to an example embodiment. In FIG. 3B, a local minimum corresponding to the cutoff frequency of plasma may be represented as a black point.

In FIG. 3B, the horizontal axis may represent a frequency in GHz units, and the vertical axis may represent a magnitude of the forward transmission gain parameter S21 of plasma in dB units. In experimental examples in FIG. 3B, plasma may be generated by substantially constant source power.

Referring to experiment examples in FIGS. 2 and 3B, when the length LA of each of the first and second antennas 111A and 112A is about 30 mm, it is identified that the magnitude of the forward transmission gain parameter S21 of plasma has a local maximum point near about 2.75 GHz, and decreases as the frequency increases. In addition, when the length LA of each of the first and second antennas 111A and 112A is about 40 mm, it is identified that the magnitude of the forward transmission gain parameter S21 of plasma has a local maximum point near about 2.35 GHz, and has a local minimum point near about 3.7 GHz. When the length LA of each of the first and second antennas 111A and 112A is about 40 mm, an augmented local minimum may be generated by resonance caused by the structure of the first and second antennas 111A and 112A. When the length LA of each of the first and second antennas 111A and 112A is greater than about 30 mm, it is identified that, due to confusion between a resonance frequency caused by the physical structure of the first and second antennas 111A and 112A and a cutoff frequency, which is a characteristic frequency of plasma, an accuracy of measurement of the parameters of the plasma may be decreased.

In addition, when the length LA of each of the first and second antennas 111A and 112A is about 5 mm, it is identified that it is difficult to identify the cutoff frequency due to extreme shortness of the length LA of each of the first and second antennas 111A and 112A. Furthermore, when the length LA of each of the first and second antennas 111A and 112A is extremely short, it may be difficult to combine the first and second protection layers 118 and 119 with the first and second antennas 111A and 112A, respectively.

When the length LA of each of the first and second antennas 111A and 112A is about 10 mm or about 15 mm, it is identified that well-marked local minima are formed in the magnitude of the forward transmission gain parameter S21.

According to example embodiments, the length LA of each of the first and second antennas 111A and 112A may range from, for example, about 10 mm to about 30 mm.

According to example embodiments, the length LA of each of the first and second antennas 111A and 112A may be about 15 mm. Accordingly, the reliability of measurement using the cutoff probe 110 may be improved.

Referring to FIGS. 1 and 2 again, the rotation driving apparatus 120 may rotate the cutoff probe 110 in the plasma processing apparatus 200. According to example embodiments, when the rotation driving apparatus 120 drives the cutoff probe 110, the cutoff probe 110 may measure the parameters of the plasma at different locations from each other in the plasma processing apparatus 200. The rotation driving apparatus 120 may include, for example, a motor or an actuator to rotate the cutoff probe 110.

According to example embodiments, as the rotation driving apparatus 120 drives the cutoff probe 110, the cutoff probe 110 may measure the parameters of the plasma at different radii from each other in a plasma region PR (or a region where plasma is generated or a region where the density of plasma is equal to or greater than a certain value) of the plasma processing apparatus 200. In this case, unless specified differently, the radius may represent a distance from the center of the plasma processing apparatus 200. While the measurement by the cutoff probe 110 is not performed, the rotation driving apparatus 120 may position the cutoff probe 110 outside the plasma region PR.

Accordingly, the apparatus for measuring parameters of plasma 100 may measure the microwave band spectrum of the forward transmission gain parameter S21 at different radii in the plasma processing apparatus 200. The controller 130 may control the rotation driving apparatus 120 so that the rotation driving apparatus 120 positions the cutoff probe 110 at a desired location.

The network analyzer 140 may be a frequency scanner and at the same time, a spectrometer. The network analyzer 140 may provide an electrical signal (for example, a signal for driving the first antenna 111A) for measuring the parameters of the plasma in a frequency scanning method. In addition, the network analyzer 140 may calculate a transmission coefficient or a reflection coefficient for each frequency, based on a signal detected by the cutoff probe 110 (for example, an electrical signal generated by the second antenna 112A).

The network analyzer 140 may include a first port configured to be electrically connected to the first antenna 111A of the cutoff probe 110 and a second port configured to be electrically connected to the second antenna 112A of the cutoff probe 110. A voltage of a sine wave form applied to the first antenna 111A via the first port may be converted into a microwave, and the microwave may be emitted by the first antenna 111A. The network analyzer 140 may provide a chopped electrical signal to the first antenna 111A so that the first antenna 111A generates a chopped microwave, which has frequencies of different wavelengths from each other in the microwave band.

The chopped microwave may be emitted by the first antenna 111A, converted into an electrical signal by the second antenna 112A after being transferred through plasma, and transferred to the second port of the network analyzer 140. The network analyzer 140 may store data on the electrical signal generated by the second antenna 112A, based on the microwave, which has been emitted by the first antenna 111A and transferred through plasma.

The processor 150 may calculate the density of plasma, based on data stored in the network analyzer 140. The processor 150 may calculate the density of plasma, which changes as time passes.

The processor 150 may calculate the density of plasma for each radius in the plasma processing apparatus 200 based on the microwave band spectrum of the forward transmission gain parameter S21 according to the radius.

The controller 130, the network analyzer 140, and the processor 150 may include a computing system such as a workstation computer, a desktop computer, a laptop computer, and a tablet computer. Each of the controller 130, the network analyzer 140, and the processor 150 may include discrete hardware, or discrete software included in hardware. The controller 130, the network analyzer 140, and the processor 150 may also include a simple controller, a complex processor such as a microprocessor, a central processing unit (CPU), and a graphics processing unit (GPU), a processor configured by software, or dedicated hardware or dedicated software. The controller 130, the network analyzer 140, and the processor 150 may be implemented by, for example, a general purpose computer, a digital signal processor (DSP), a field programmable gate array (FPGA), or application-specific hardware such as an application-specific integrated circuit (ASIC).

According to some embodiments, operations of the controller 130, the network analyzer 140, and the processor 150 may be implemented as instructions stored on a machine-readable medium readable and executable by one or more processors. In this case, the machine-readable medium may include an arbitrary mechanism for storing and/or transmitting information in a form readable by a machine (for example, a computing device). For example, the machine-readable medium may include read-only memory (ROM), random access memory (RAM), a magnetic disk storage medium, an optical storage medium, a flash memory apparatus, electrical, optical, acoustical, or other different forms of radio signals (for example, infrared signals, digital signals, or the like), and other arbitrary signals.

The controller 130, the network analyzer 140, and the processor 150 may include firmware, software, routines, and instructions for performing operations described, or arbitrary processes to be described below, of the controller 130, the network analyzer 140, and the processor 150. However, this is only for convenience of description, and it should be understood that the operations of the controller 130 and the network analyzer 140 described above may be executed by a computing apparatus, a processor, a controller, or other apparatuses executing firmware, software, routines, instructions, etc.

Figure 4:
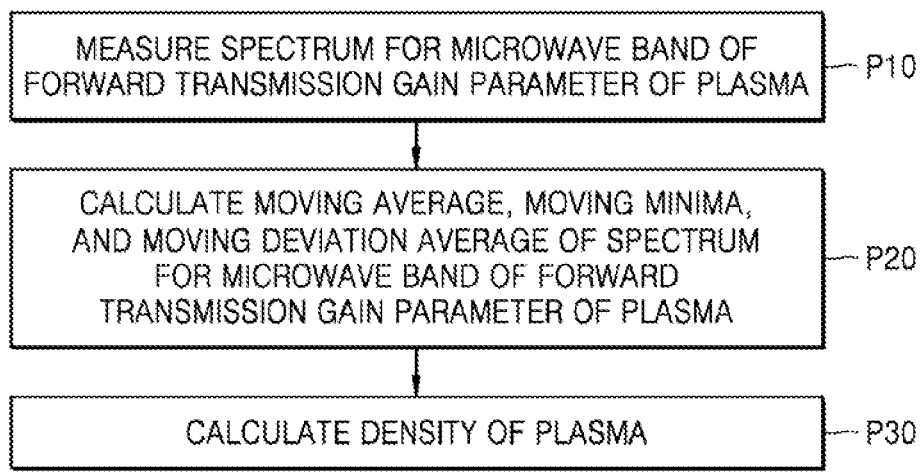
FIG. 4 is a flowchart of a method of measuring parameters of plasma, according to an embodiment.

FIG. 4 is a flowchart of a method of measuring the parameters of plasma, according to an embodiment.

Figure 5:
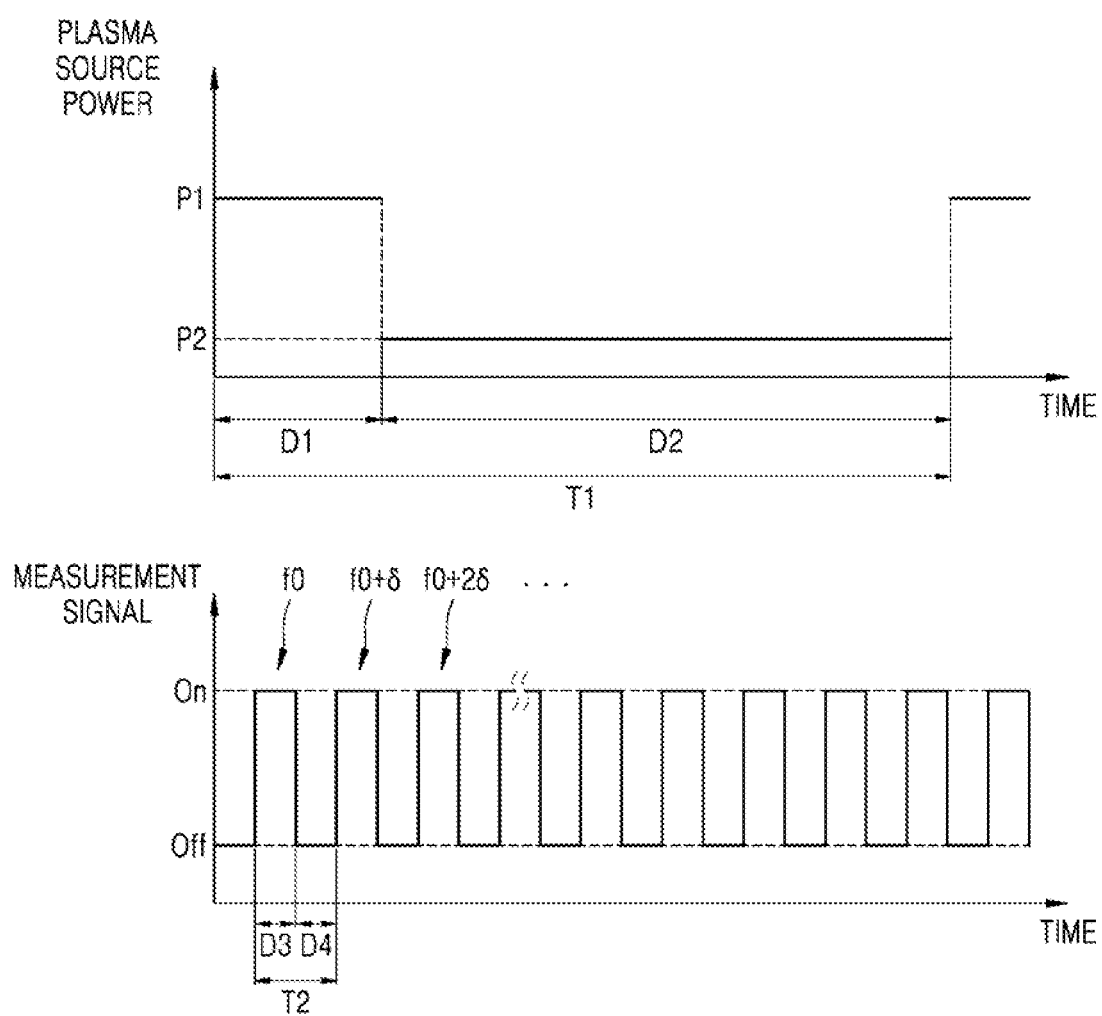
FIG. 5 is a graph of an operation of a plasma processing system, according to an embodiment.

FIG. 5 is a graph of an operation of the plasma processing system 10, according to an example embodiment.

Referring to FIGS. 1, 2, 4, and 5, the microwave band spectrum of the forward transmission gain parameter S21 of plasma may be measured (P10).

In this case, source power of the plasma processing apparatus 200 for generating plasma as a measurement object may, as illustrated in FIG. 5, repeatedly change with a first period T1. The first period T1 may include a first duty D1 and a second duty D2. During the first duty D1, the source power applied to the plasma processing apparatus 200 may include first power P1. During the second duty D2, the source power applied to the plasma processing apparatus 200 may include second power P2. The first power P1 may be greater than the second power P2.

In an example, the second power P2 may be off power (that is, about 0), and in this case, the first duty D1 may be an on duty, and the second duty D2 may be an off duty. In another example, each of the first power P1 and the second power P2 may be greater than about 0.

A measurement signal may illustrate on and off of a signal applied to the first antenna 111A. The measurement signal may have a second period T2. The second period T2 may include a third duty D3, in which the measurement signal is on, and a fourth duty D4, in which the measurement signal is off. During the third duty D3, a signal for forming a microwave may be applied to the first antenna 111A, but during the fourth duty D4, a signal for forming a microwave may not be applied to the first antenna 111A. In other words, a chopped signal may be applied to the first antenna 111A.

According to example embodiments, the cutoff probe 110 may measure the parameters of the plasma in a frequency scanning method. When a frequency of an electrical signal used for measurement during one third duty D3 is f0, a frequency of the electrical signal used for measurement during a subsequent third duty D3 may be f0+δ, and a frequency of the electrical signal used for measurement during a next subsequent third duty D3 may be f0+2δ. In other words, the frequency of the measurement signal applied to the first antenna 111A may be different for each third duty D3.

As an example, a frequency of a signal applied to each third duty D3 may be less than a frequency of a signal applied to each subsequent third duty D3. During one of the third duties D3, a signal having a frequency of about 1 GHz may be applied to the cutoff probe 110, and during a third duty D3 immediately subsequent to the one of the third duties D3, a signal having a frequency of about 1.04 GHz may be applied to the cutoff probe 110, and during the next third duty D3, a signal having a frequency of about 1.08 GHz may be applied to the cutoff probe 110.

In an example, a frequency of a signal applied to each third duty D3 may be greater than a frequency of a signal applied to subsequent third duties D3. During one of the third duties D3, a signal having a frequency of about 1 GHz may be applied to the cutoff probe 110, and during a third duty D3 immediately subsequent to the one of the third duties D3, a signal having a frequency of about 0.96 GHz may be applied to the cutoff probe 110, and during the next third duty D3, a signal having a frequency of about 0.92 GHz may be applied to the cutoff probe 110.

According to example embodiments, the second period T2 may be less than the first period T1. According to example embodiments, the first period T1 may range from about 6 to about 100 times the second period T2. According to example embodiments, the first period T1 may range from about 8 to about 11 times the second period T2.

According to example embodiments, the first period T1 may be different from the second period T2 by other than an integer multiple. In other words, there may not be an integer, which makes a value obtained by multiplying the second period T2 by the integer be identical to the first period T1. In this case, because a start time point of measurement (that is, a start time point of the third duty D3) changes to a different start time point in the first period T1, the reliability and uniformity of measurement of the parameters of the plasma may be increased.

According to example embodiments, some of the third duties D3 may overlap the first duty D1, and the others of the third duties D3 may overlap the second duty D2. In other words, some measurements by the cutoff probe 110 may be performed when source power of the first power P1, which is relatively high, is applied to the plasma processing apparatus 200, and the other measurements by the cutoff probe 110 may be performed when source power of the second power P2, which is relatively low, is applied to the plasma processing apparatus 200. Because the plasma density in the plasma processing apparatus 200 has a positive correlation with the source power, the plasma density, which is a measurement object of the cutoff probe 110, may change over time.

According to example embodiments, a ratio of the number of third duties D3 overlapping the first duty D1 to the number of third duties D3 overlapping the second duty D2 may be similar to a ratio of the length of the first duty D1 to the length of the second duty D2. For example, when the ratio of the length of the first duty D1 to the length of the second duty D2 is about ¼, about 20% of the third duties D3 may overlap the first duty D1, and about 80% of the third duties D3 may overlap the second duty D2.

Figure 6:
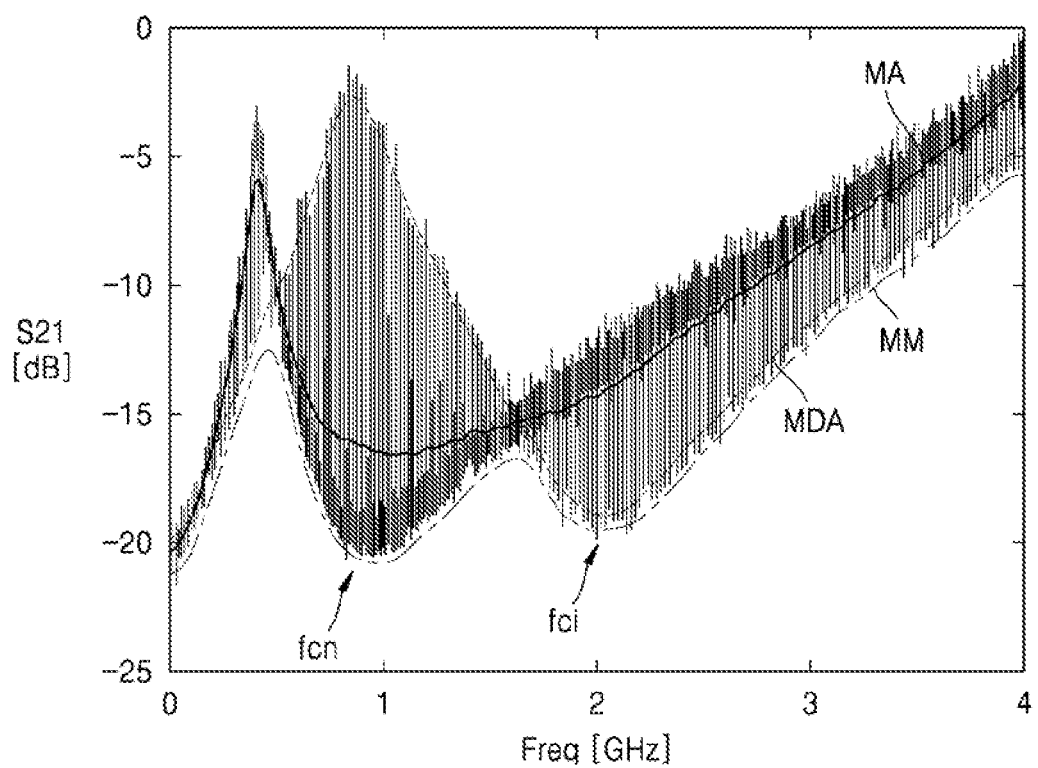
FIG. 6 is a graph for describing a method of measuring parameters of plasma, according to an embodiment.

FIG. 6 is a graph for describing a method of measuring the parameters of plasma, according to an embodiment.

FIG. 6 further illustrates a spectrum for a microwave band of the forward transmission gain parameter S21 of plasma having changing density, and graphs of values calculated from the spectrum. The values calculated from the spectrum may include a moving average MA, a moving minimum MM, and a moving deviation average MDA.

Referring to FIGS. 1, 2, 4, and 6, any one or more of the moving average MA, the moving minimum MM, and the moving deviation average MDA of the microwave band spectrum of the forward transmission gain parameter S21 of plasma may be calculated (P20). The processor 150 may calculate the moving average MA, the moving minimum MM, and the moving deviation average MDA.

The spectrum of the microwave band of the forward transmission gain parameter S21 illustrated in FIG. 6 may be a measured value for plasma generated by the plasma processing apparatus 200 to which source power having the first duty D1 less than the second duty D2 is applied, as illustrated in FIG. 5.

The moving average MA may, for each frequency, represent an average value of measurement values in a certain range of the frequency. The moving minimum MM may, for each frequency, represent a minimum value of measurement values in a certain range of the frequency.

The moving deviation average MDA may, for each frequency, represent an average of some measurement values that are relatively far apart from the moving average MA among the measurement values in a certain frequency range. In other words, calculating the moving deviation average MDA may include classifying data sets included in the certain frequency range within the spectrum for the microwave band of the forward transmission gain parameter S21 into a first subset and a second subset based on a distance from the moving average MA, and calculating an average of the first subset. In this case, a distance between an arbitrary measurement value included in the first subset and the moving average MA may be greater than a distance between an arbitrary measurement value included in the second subset and the moving average MA.

A certain frequency range for calculating the moving average MA, the moving minimum MM, and the moving deviation average MDA may be determined, based on the magnitude of the microwave band, in which the forward transmission gain parameter S21 is measured, and locations of estimated minimum points.

As an example, the certain frequency range for calculating the moving average MA, the moving minimum MM, and the moving deviation average MDA may be about 1% of the magnitude of the microwave band, in which the forward transmission gain parameter S21 is measured. As an example, the certain frequency range for calculating the moving average MA, the moving minimum MM, and the moving deviation average MDA may be about 5% of the magnitude of the microwave band, in which the forward transmission gain parameter S21 is measured.

As an example, when an estimated cutoff frequency of a transmission parameter of plasma is equal to or less than about 1 GHz, the certain frequency range for calculating the moving average MA, the moving minimum MM, and the moving deviation average MDA may be about 1% of the magnitude of the microwave band, in which the forward transmission gain parameter S21 is measured, and when an estimated cutoff frequency of a transmission parameter of plasma is in a range from about 1 to about 3 GHz, the certain frequency range for calculating the moving average MA, the moving minimum MM, and the moving deviation average MDA may be about 5% of the magnitude of the microwave band, in which the forward transmission gain parameter S21 is measured.

As a non-limiting example, when the measured microwave band of the forward transmission gain parameter S21 of plasma is about 0 to about 4 GHz, about 5% of the wavelength band may be about 0.2 GHz. In this example, the moving average MA for a frequency of about 1 GHz may be an average value of the forward transmission gain parameter S21 of plasma in a range of about 0.9 to about 1.1 GHz, the moving minimum MM for the frequency of about 1 GHz may be a minimum of the forward transmission gain parameter S21 of plasma in a range of about 0.9 to about 1.1 GHz, and the moving deviation average MDA for a frequency of about 1 GHz may be an average value of values, for example, farthest to the 10th farthest ones apart from moving average MA in a vertical axis direction (that is, a gain axis direction) from the moving average MA among the measurement values of the forward transmission gain parameter S21 of plasma in a range of about 0.9 to about 1.1 GHz.

In the above-described examples, it is described that the frequency ranges for calculating the moving average MA, the moving minimum MM, and the moving deviation average MDA from the microwave band spectrum of the forward transmission gain parameter S21 of plasma are identical, but this is only an example, and the technical idea of the disclosure is not limited thereto.

As described with reference to FIG. 5, the third duty D3, which is the measurement time period of the cutoff probe 110, may stochastically overlap one of the first duty D1 and the second duty D2. For example, when the second duty D2 is about four times the first duty D1, about 20% of measurement points by the cutoff probe 110 may correspond to the first duty D1, and about 80% of measurement points by the cutoff probe 110 may correspond to the second duty D2.

In this case, among the measurement time periods of the data set included in the certain frequency range for calculating the moving minimum MM, contribution of a relatively long duty (for example, the second duty D2) may be greater than contribution of a relatively short duty (for example, the first duty D1). In this case, with reference to FIG. 6, the moving minimum MM may simultaneously contact a local minimum point formed in the spectrum for the microwave band of the forward transmission gain parameter S21 of plasma generated by the source power of a low level (that is, low density plasma) and a local minimum point formed in the spectrum for the microwave band of the forward transmission gain parameter S21 of plasma generated by the source power of a high level (that is, high density plasma). In other words, the moving minimum MM may have two or more local minima points, and contribution of the first duty D1 on the moving minimum MM may be less than contribution of the second duty D2 on the moving minima MM.

The moving average MA may properly represent a measurement value of a stochastically relatively long duty (for example, the second duty D2). A ratio of the number of measurement values measured during the first duty D1 over the number of measurement values measured during the second duty D2 among measurement values of the forward transmission gain parameter S21 for calculating the moving average MA may be substantially the same as a ratio of the length of the first duty D1 over the length of the second duty D2. In other words, contribution of the second duty D2 on the moving average MA may be dominant over contribution of the first duty D1.

The moving deviation average MDA may be calculated as an average of measurement values relatively far away from the moving average MA, on which contribution of the second duty D2 is dominant, among measurement values for the forward transmission gain parameter S21 of plasma. Accordingly, contribution of the first duty D1 on the moving deviation average MDA may be dominant over contribution of the second duty D2 on the moving deviation average MDA. Accordingly, the moving deviation average MDA may represent a spectrum for the microwave band of the forward transmission gain parameter S21 of plasma generated by the source power of a stochastically high level (that is, high density plasma).

Next, referring to FIGS. 1, 4, and 6, the density of plasma may be calculated (P30). Calculation of the density of plasma in operation P30 may be performed by the processor 150.

According to example embodiments, the density (e.g., a first density) of plasma of a relatively short duty (that is, the first duty D1) may be calculated based on a cutoff frequency fci (e.g., a first local minimum frequency) common to the moving minimum MM and the moving deviation average MDA. In the cutoff frequency fci, each of the moving minimum MM and the moving deviation average MDA may have a local minimum value at substantially the same frequency. The density of plasma of a short duty (that is, the first duty D1) may be calculated by applying the cutoff frequency fci to Formula 1.

According to example embodiments, the density (e.g., a second density) of plasma of a relatively long duty (that is, the second duty D2) may be calculated based on a cutoff frequency fcn (e.g., a second local minimum frequency) uncommon to the moving minimum MM and the moving deviation average MDA. The cutoff frequency fcn may be a minimum point of the moving minimum MM, but may not be a minimum point of the moving deviation average MDA. The density of plasma of a relatively long duty (that is, the second duty D2) may be calculated by applying the cutoff frequency fcn to Formula 1.

When all of the moving average MA, the moving minimum MM, and the moving deviation average MDA have an identical minimum point (hereinafter, a triple minimum point), the triple minimum point may be a notch point caused by a physical structure of the cutoff probe 110 or the plasma processing apparatus 200, and may not be considered at the time of calculating the density of plasma.

In addition, unlike as described with reference to FIG. 5, when the length of each of the first duties D1 is the same as the length of each of the second duties D2, the plasma density corresponding to a duty of high source power may be calculated based on a higher cutoff frequency, and plasma density corresponding to a duty of low source power may be calculated based on a lower cutoff frequency.

Figure 7:
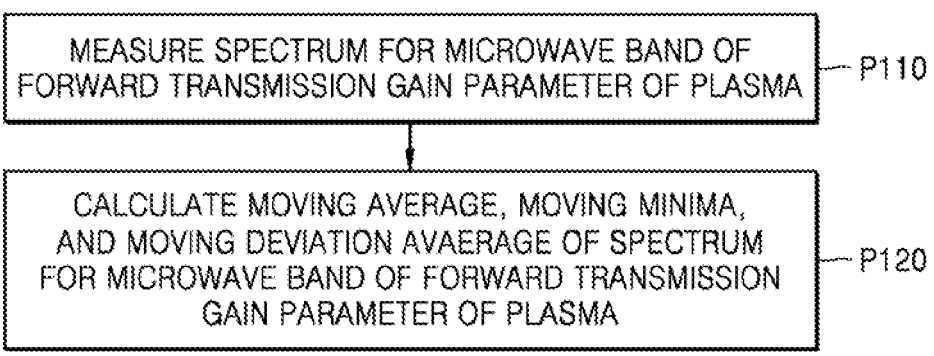
FIG. 7 is a flowchart of a wafer processing method according to an embodiment.

FIG. 7 is a flowchart of a wafer processing method according to an example embodiment.

Referring to FIG. 7, manufacturing of a semiconductor element may include processing a wafer by using plasma (P110) and measuring the parameters of the plasma (P120).

The processing of a wafer by using plasma may, as described above, include any one or more of plasma annealing, plasma etching, plasma enhanced chemical vapor deposition, physical vapor deposition, and plasma cleaning. Plasma for processing a wafer may, as described above with reference to FIG. 4, be generated by source power, which changes with the first period T1. Accordingly, a wafer may be processed by plasma, which changes the density thereof over time.

In an example, the measuring the parameters of the plasma in operation P120 may be substantially and simultaneously performed with the processing of a wafer by using plasma in operation P110. In an example, the measuring the parameters of the plasma in operation P120 may be performed before or after the processing of a wafer by using plasma in operation P110. In another example, the measuring the parameters of the plasma in operation P120 may periodically performed based on a certain reliability test period.

A detailed aspect of the measuring the parameters of the plasma is generally similar to descriptions given with reference to FIGS. 4 through 6, and duplicate description thereof is omitted.

Figure 8:
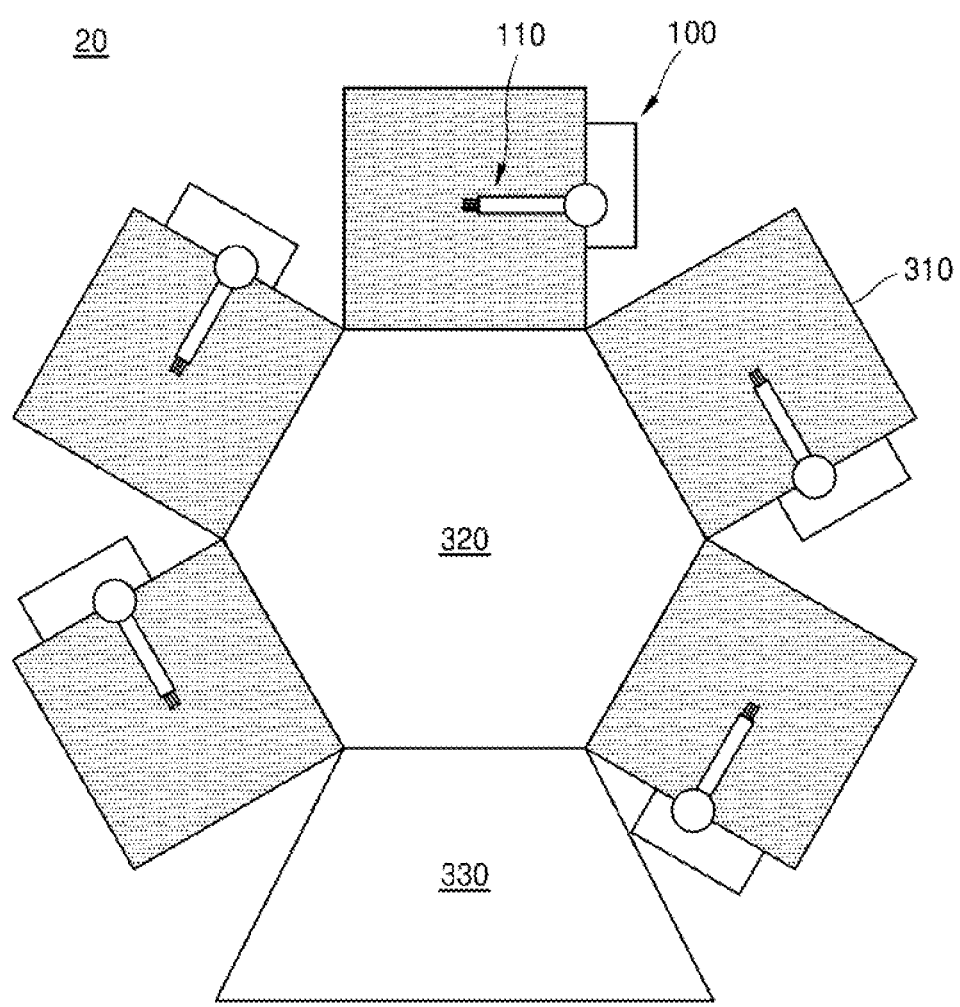
FIG. 8 is a diagram of a plasma processing system according to an embodiment.

FIG. 8 is a diagram of a plasma processing system 20 according to an example embodiment.

Referring to FIG. 8, the plasma processing system 20 may include the apparatus for measuring parameters of plasma 100, plasma processing apparatuses 310, a platform 320, and an input/output port 330.

Each of the plasma processing apparatuses 310 may perform any one of various plasma processes exemplified in relation with the plasma processing apparatus 200 described with reference to FIG. 1. The plasma processing apparatuses 310 may perform different processes from each other. For example, some of the plasma processing apparatuses 310 may perform a deposition process on a first material, while the others of the plasma processing apparatuses 310 may perform a deposition process on a second material that is different from the first material.

The plasma processing apparatuses 310 may be arranged to surround the platform 320 along a periphery of the platform 320. The platform 320 may include a moving arm. The moving arm may be configured to introduce a wafer into the plasma processing apparatuses 310, or withdraw a wafer, on which processes have been performed by the plasma processing apparatuses 310, from the plasma processing apparatuses 310. According to example embodiments, the platform 320 may further include a buffer configured to store a wafer before and after processes (or one lot of wafers).

Wafers on which plasma processing has been performed (or, one lot of wafers) may be exported to the outside via the input/output port 330. Wafers on which plasma processing has been performed (or, one lot of wafers) may be imported from the outside via the input/output port 330.

According to example embodiments, the plasma processing system 20 may include the apparatus for measuring parameters of plasma 100 arranged in each of a plurality of plasma processing apparatuses 310, which are arranged adjacent to each other. The apparatus for measuring parameters of plasma 100 may include the cutoff probe 110, which is not a cutoff probe of a conventional linear movement type but is of a rotational movement type, and accordingly, may be installed in a narrow space between the plasma processing apparatuses 310. Accordingly, the plasma processing system 20 may measure the parameters of the plasma in real time during the processes, and may calculate the density of plasma based on the parameters of the plasma. Accordingly, the reliability of the plasma processing system 20 may be improved.

While the disclosure has been particularly shown and described with reference to embodiments thereof, it will be understood that various changes in form and details may be made therein without departing from the spirit and scope of the following claims.

What is claimed is:

1. An apparatus for measuring parameters of plasma, the apparatus comprising:
   a cutoff probe; and
   at least one processor configured to provide, to the cutoff probe, a signal for measuring the parameters of the plasma in a plasma processing apparatus,
   wherein the cutoff probe comprises:
   a first antenna having a line shape and configured to emit a microwave to the plasma in response to the signal provided by the at least one processor;
   a second antenna having a line shape and configured to generate an electrical signal in response to receiving the microwave that has been emitted by the first antenna and transferred through the plasma;
   a first signal line connecting the first antenna to the at least one processor;
   a second signal line connecting the second antenna to the at least one processor;
   a first insulating layer covering the first signal line;
   a second insulating layer covering the second signal line;
   a first shield covering the first insulating layer;
   a second shield covering the second insulating layer;
   an end protection layer covering an end of each of the first insulating layer, the second insulating layer, the first shield, and the second shield;
   a first antenna protection layer comprising a first insulating material and covering the first antenna, wherein the first antenna protection layer includes a first insulating portion and a second insulating portion, and wherein: i) the first insulating portion is in contact with a side surface of the first antenna, and ii) the second insulating portion is in contact with an end of the first antenna; and
   a second antenna protection layer comprising a second insulating material and covering the second antenna.

2. The apparatus of claim 1, wherein a thickness of the second insulating portion is about 0.01 to about 0.1 times a length of the first antenna.

3. The apparatus of claim 1, wherein the first insulating layer and the second insulating layer comprise $SiO_2$.

4. The apparatus of claim 1, further comprising an actuator configured to rotate the cutoff probe.

5. The apparatus of claim 4, wherein the actuator is configured to position the cutoff probe at different radii in the plasma processing apparatus.

6. The apparatus of claim 1, wherein the first insulating portion is a tube type insulating layer and the second insulating portion is a paste type insulating layer.

7. The apparatus of claim 1, wherein both the first insulating portion and the second insulating portion are a paste type insulating layer.

8. An apparatus for measuring parameters of plasma, the apparatus comprising:
a cutoff probe; and
at least one processor configured to provide, to the cutoff probe, a signal for measuring the parameters of the plasma in a plasma processing apparatus,
wherein the cutoff probe comprises:
a first antenna having a line shape and configured to emit a microwave to the plasma in response to the signal provided by the at least one processor;
a second antenna having a line shape and configured to generate an electrical signal in response to receiving the microwave that has been emitted by the first antenna and transferred through the plasma;
a first signal line connecting the first antenna to the at least one processor;
a second signal line connecting the second antenna to the at least one processor;
a first insulating layer covering the first signal line;
a second insulating layer covering the second signal line;
a first shield covering the first insulating layer;
a second shield covering the second insulating layer;
an end protection layer covering an end of each of the first insulating layer, the second insulating layer, the first shield, and the second shield;
a first antenna protection layer comprising a first insulating material and covering the first antenna; and
a second antenna protection layer comprising a second insulating material and covering the second antenna,
wherein the at least one processor is configured to provide the signal to the first antenna in a frequency scanning method, and to generate a microwave band spectrum of a forward transmission gain of the plasma based on the microwave emitted by the first antenna, transferred through the plasma, and detected by the second antenna.

9. The apparatus of claim 8, wherein, during a first duty, the plasma processing apparatus applies a first power for generating the plasma, and during a second duty, the plasma processing apparatus applies a second power for generating the plasma,
wherein the second duty is longer than the first duty, and
wherein the first duty and the second duty are alternately repeated.

10. The apparatus of claim 9, wherein the at least one processor is configured to calculate a first density of the plasma corresponding to the first duty and a second density of the plasma corresponding to the second duty, based on the microwave band spectrum of the forward transmission gain of the plasma.

11. The apparatus of claim 10, wherein the at least one processor is configured to calculate a moving minimum of the microwave band spectrum of the forward transmission gain of the plasma.

12. The apparatus of claim 11, wherein the at least one processor is configured to calculate a moving average of the microwave band spectrum of the forward transmission gain of the plasma.

13. The apparatus of claim 12, wherein the at least one processor is configured to calculate a moving deviation average, which is an average of a part of the microwave band spectrum of the forward transmission gain of the plasma, the part of the microwave band spectrum being selected based on a difference between the part and the moving average of the microwave band spectrum.

14. The apparatus of claim 13, wherein the at least one processor is configured to calculate the first density of the plasma based on a minimum frequency common to the moving deviation average and the moving minimum.

15. The apparatus of claim 13, wherein the at least one processor is configured to calculate the second density of the plasma based on a minimum frequency of the moving minimum.

16. The apparatus of claim 8, wherein, during a first duty, the plasma processing apparatus applies a first power for generating the plasma, and during a second duty, the plasma processing apparatus applies a second power for generating the plasma,
wherein a length of the first duty is identical to a length of the second duty,
wherein the first power is greater than the second power, and
wherein the first duty and the second duty are alternately repeated.

17. The apparatus of claim 16, wherein the at least one processor is configured to calculate a moving minimum of the microwave band spectrum of the forward transmission gain of the plasma,
wherein the moving minimum comprises a first local minimum frequency and a second local minimum frequency, which correspond to different local minima from each other,
wherein the first local minimum frequency is greater than the second local minimum frequency, and
wherein the at least one processor is configured to calculate a density of the plasma generated when the first duty is applied based on the first local minimum frequency and calculate the density of the plasma generated when the second duty is applied based on the second local minimum frequency.

* * * * *